(12) United States Patent
Ge et al.

(10) Patent No.: US 12,704,278 B2
(45) Date of Patent: Aug. 11, 2026

(54) FILTRATION DEVICE AND AIR CONDITIONER

(71) Applicants: GD Midea Heating & Ventilating Equipment Co., Ltd., Foshan (CN); Hefei Midea Heating & Ventilating Equipment Co., Ltd., Hefei (CN)

(72) Inventors: Shanshan Ge, Foshan (CN); Lin Wu, Foshan (CN); Yong Gu, Foshan (CN); Changli Kan, Foshan (CN); Yunzhi Li, Foshan (CN); Menghao Zhu, Foshan (CN)

(73) Assignees: GD MIDEA HEATING & VENTILATING EQUIPMENT CO., LTD., Foshan (CN); HEFEI MIDEA HEATING & VENTILATING EQUIPMENT CO., LTD., Hefei (CN)

( * ) Notice: Subject to any disclaimer, the term of this patent is extended or adjusted under 35 U.S.C. 154(b) by 337 days.

(21) Appl. No.: 18/389,158

(22) Filed: Nov. 13, 2023

(65) Prior Publication Data

US 2024/0077219 A1 Mar. 7, 2024

Related U.S. Application Data

(63) Continuation of application No. PCT/CN2021/135244, filed on Dec. 3, 2021.

(30) Foreign Application Priority Data

Jun. 8, 2021 (CN) ......................... 202110636359.8

(51) Int. Cl.
*B01D 53/02* (2006.01)
*B01D 46/00* (2022.01)
*F24F 8/108* (2021.01)

(52) U.S. Cl.
CPC .......... *F24F 8/108* (2021.01); *B01D 46/0005* (2013.01)

(58) Field of Classification Search
CPC .. B01D 46/0005; F24F 1/0073; F24F 13/084; F24F 13/28; F24F 8/108
See application file for complete search history.

(56) References Cited

U.S. PATENT DOCUMENTS 4,193,844 A * 3/1980 Neumann .......... B01D 46/0094 55/504
4,343,149 A * 8/1982 Abthoff ................ F01N 3/0226 55/529

(Continued)

FOREIGN PATENT DOCUMENTS

CN 201116760 Y 9/2008
CN 101368759 A 2/2009

(Continued)

OTHER PUBLICATIONS

Translation of CN209068730 (Year: 2019).*

(Continued)

*Primary Examiner* — Christopher P Jones
(74) *Attorney, Agent, or Firm* — Morgan, Lewis & Bockius LLP

(57) ABSTRACT

Provided are a filtration device and an air conditioner. The filtration device is applied in the air conditioner, and includes a frame and a filtration structure. The filtration structure is detachably connected to the frame by a first buckle. The frame is configured to be mounted at a housing of the air conditioner. In the filtration device according to the present disclosure, the filtration structure is detachably connected to the frame by the first buckle. After the filtration (Continued)

device is used for a period of time, a user can disassemble the filtration structure for cleaning, maintenance, or replacement.

10 Claims, 4 Drawing Sheets

(56) References Cited

U.S. PATENT DOCUMENTS

| | | | | |
|---|---|---|---|---|
| 5,403,383 | A * | 4/1995 | Jaisinghani | B03C 3/155 95/79 |
| 6,497,740 | B1 | 12/2002 | Moretti | |
| 2003/0230063 | A1 * | 12/2003 | Kubokawa | B01D 46/10 55/497 |
| 2004/0065067 | A1 * | 4/2004 | Chen | B01D 46/0004 55/495 |
| 2006/0168925 | A1 * | 8/2006 | Whittemore | F04D 29/646 55/490 |
| 2014/0182254 | A1 * | 7/2014 | Desai | B01D 46/58 55/501 |
| 2016/0236126 | A1 * | 8/2016 | Law | B01D 46/0097 |
| 2019/0390860 | A1 * | 12/2019 | Han | F24F 1/0007 |
| 2023/0151977 | A1 * | 5/2023 | Lu | F24F 1/04 165/47 |
| 2024/0066453 | A1 * | 2/2024 | Wong | B01D 46/10 |

FOREIGN PATENT DOCUMENTS

| | | | |
|---|---|---|---|
| CN | 102207328 | A | 10/2011 |
| CN | 202973474 | U | 6/2013 |
| CN | 206176696 | U | 5/2017 |
| CN | 206709331 | U | 12/2017 |
| CN | 207527811 | U | 6/2018 |
| CN | 109297177 | A | 2/2019 |
| CN | 209068730 | U | 7/2019 |
| CN | 110307598 | A | 10/2019 |
| CN | 212157616 | U | 12/2020 |
| CN | 212408912 | U | 1/2021 |
| KR | 20200034870 | A | 4/2020 |
| WO | WO 2020259105 | A1 | 12/2020 |

OTHER PUBLICATIONS

Translation of CN212157616 (Year: 2020).*

Midea Group Co., Ltd., Second Chinese Office Action, CN Patent Application No. 202110636359.8, Oct. 31, 2024, 11 pgs.

Midea Group Co., Ltd., Third Chinese Office Action, CN Patent Application No. 202110636359.8, Jan. 13, 2025, 12 pgs.

Midea Group Co., Ltd., WO, PCT/CN2021/135244, Mar. 9, 2022, 4 pgs.

Midea Group Co., Ltd., IPRP, PCT/CN2021/135244, Nov. 21, 2023, 5 pgs.

Midea Group Co., Ltd., First Chinese Office Action, CN Patent Application No. 202110636359.8, Jun. 20, 2024, 15 pgs.

Midea Group Co., Ltd., Extended European Search Report, EP Patent Application No. 21944877.6, Aug. 8, 2024, 8 pgs.

Midea Group Co., Ltd., ISR, PCT/CN2021/135244, Mar. 9, 2022, 3 pgs.

* cited by examiner

FILTRATION DEVICE AND AIR CONDITIONER

This application is a continuation of International (PCT) Patent Application No. PCT/CN2021/135244 filed on Dec. 3, 2021, which claims a priority to Chinese Patent Application No. 202110636359.8, filed with China National Intellectual Property Administration on Jun. 8, 2021, and titled "FILTRATION DEVICE AND AIR CONDITIONER", the entire content of which is incorporated herein by reference.

FIELD

The present disclosure relates to the field of air conditioning technologies, and more specifically, to a filtration device and an air conditioner.

BACKGROUND

A long period of use of a filtration structure of an air conditioner may cause the filtration structure to fail or dust to accumulate on the filtration structure, and therefore the filtration structure may need to be disassembled for cleaning after a period of use. Filtration structure mounted by fasteners such as screws, may be inconvenient to disassemble.

SUMMARY

In some embodiments, a filtration device for an air conditioner includes a frame and a filtration structure. The filtration structure is detachably connected to the frame by a first buckle. The frame is configured to be mounted to a housing of the air conditioner.

Some embodiments of the filtration device according to the present disclosure may be applied in an air conditioner, and may be mounted at the housing of the air conditioner for use to ensure an effect of filtering out impurities during use of the air conditioner, which may ensure that impurities in an airflow entering the air conditioner are reduced, and may increase purity of air entering the air conditioner and may further increase purity of the air blown out of the air conditioner.

Specifically, the filtration device includes the frame and the filtration structure. The frame may be mounted at the housing of the air conditioner to ensure mounting of the entire filtration device. The filtration structure may be detachably connected to the frame by the buckle, and can provide an effect of filtering out impurities during operation of the air conditioner. In particular, the filtration structure is connected to the frame in a detachable manner. After the filtration device has been used for a period of time, a user can disassemble the filtration structure for cleaning, maintenance, or replacement. In addition, the filtration structure is mounted by the first buckle, which makes it more convenient for the user to disassemble and assemble the filtration structure, and facilitates operations of the user. Further, the frame itself may be mounted with a filtration member to realize multiple filtration.

Therefore, in the filtration device according to the present disclosure, the filtration structure may be detachably connected to the frame by the first buckle. After the filtration device has been used for a period of time, the user can disassemble the filtration structure for cleaning, maintenance, or replacement.

In some embodiments, the frame is provided with the first buckle. The filtration structure is snapped at the first buckle.

In some embodiments, the frame is provided with a mounting protrusion at a circumferential edge of the frame. The mounting protrusion extends towards a lateral side of the frame and is formed as a mounting position. The first buckle is disposed at the mounting protrusion. The filtration structure is detachably mounted at the mounting position.

In some embodiments, the frame includes a first filtration screen. The filtration structure includes a second filtration screen. The first filtration screen has a mesh number unequal to (e.g., different from) a mesh number of the second filtration screen.

In some embodiments, the second filtration screen has the mesh number greater than the mesh number of the first filtration screen.

In some embodiments, an air conditioner is provided. The air conditioner includes: a housing having a return air inlet and an air outlet that are in communication with each other; and the filtration device according to any one of the above technical solutions. The frame of the filtration device is mounted at the return air inlet and is detachably connected to the housing.

The air conditioner according to some embodiments includes the filtration device. Therefore, the air conditioner may provide one or more of the advantageous effects of the above filtration device. Details thereof will be omitted here.

In addition, the housing has the air inlet and the return air inlet that are in communication with each other. An air duct is formed between the air inlet and the return air inlet. When the air conditioner is in operation, external air enters into the air duct from the return air inlet, and is blown out from the air outlet. The filtration device is mounted at the return air inlet. The filtration device provides filtration for the airflow passing through the return air inlet to ensure that the impurities in the airflow entering the air duct are significantly reduced, which may increase purity of the air entering the air duct, and may improve cleanness of an interior of the air conditioner, and may further increase purity of the air blown out from the air outlet.

In particular, the filtration device is directly connected to the housing at the return air inlet without adopting a flanging structure used in the related art. On the one hand, a quantity of components of the air conditioner can be lowered to reduce both a size and a weight of the air conditioner. On the other hand, assembly by a worker may be facilitated, which further improves an assembly efficiency of the filtration device, improving a manufacturing efficiency of the air conditioner.

Therefore, in the air conditioner according to some embodiments, since the filtration device is directly connected to the housing, the flanging structure may be eliminated, which may reduce the size and/or the weight of the air conditioner, and facilitate assembly and manufacturing.

In some embodiments, the frame includes a frame body and a second buckle disposed at the frame body, and is snap-fit at the return air inlet by the second buckle.

In some embodiments, the frame includes a frame body and a first mounting hole formed at the frame body. The housing has a second mounting hole formed thereon. The air conditioner further includes a fastener passing through the first mounting hole and mounted in the second mounting hole.

In some embodiments, a mounting protrusion of the frame has a first sealing surface and extends into the housing. The first sealing surface is attached to an inner wall of the housing.

In some embodiments, the mounting protrusion of the frame and the frame are integrally formed.

In some embodiments, the frame is provided with a limiting protrusion at a circumferential edge of the frame. The limiting protrusion extends towards a circumferential side of the frame and has a second sealing surface facing towards a side of the return air inlet. The second sealing surface is attached to the housing.

In some embodiments, the housing is provided with a flanging at the return air inlet. The second sealing surface is attached to the flanging.

BRIEF DESCRIPTION OF THE DRAWINGS

The above and/or additional aspects and advantages of the present disclosure will become more apparent and more readily understandable from the following description of embodiments taken in conjunction with the accompanying drawings.

Figure 1:
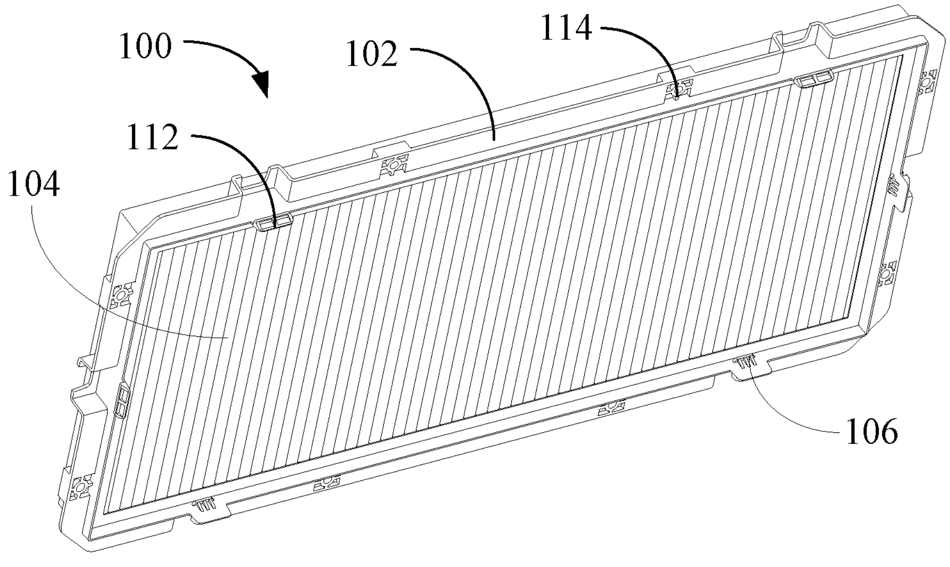
FIG. 1 is a schematic structural diagram of a filtration device according to an embodiment of the present disclosure.

Correspondences between reference numerals in FIG. 1 to FIG. 7 and names of members are as follows:

100 filtration device, 102 frame, 104 filtration structure, 106 first buckle, 108 mounting protrusion, 110 mounting position, 112 second buckle, 114 first mounting hole, 116 limiting protrusion, 118 first sealing surface, 120 second sealing surface, 122 frame body, 202 housing, 204 return air inlet, 206 second mounting hole, 208 flanging.

DETAILED DESCRIPTION OF THE EMBODIMENTS

In order to clarify and explain the above objects, features, and advantages of the present disclosure, the present disclosure will be further described in detail below in conjunction with the accompanying drawings and specific embodiments. It should be noted that, the embodiments of the present disclosure and features in the embodiments can be combined with each other without any conflict.

In the following description, many specific details are provided to facilitate full understanding of the present disclosure. However, the present disclosure can further be implemented in other ways different from those described herein. Therefore, the scope of the present disclosure is not limited to specific embodiments disclosed below.

A filtration device and an air conditioner according to some embodiments of the present disclosure will be described below with reference to FIG. 1 to FIG. 7.

Figure 2:
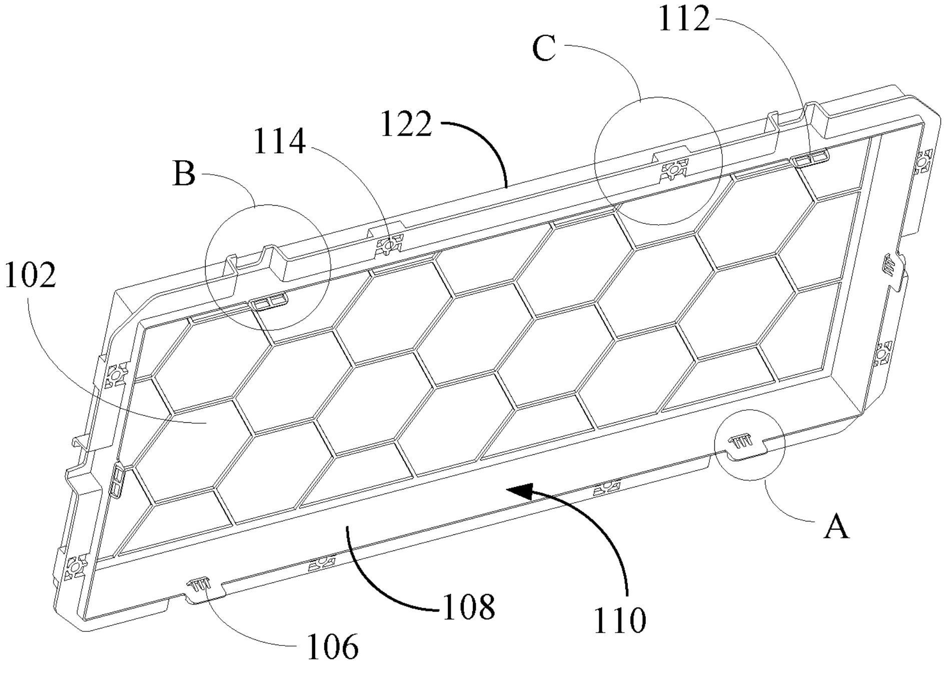
FIG. 2 is a schematic structural diagram of a frame in the filtration device illustrated in FIG. 1.

As illustrated in FIG. 1 and FIG. 2, embodiment 1 of the present disclosure provides a filtration device 100. The filtration device 100 may be applied in an air conditioner and may be mounted at a housing 202 of the air conditioner for use to ensure an effect of filtering out impurities during use of the air conditioner, which ensures that impurities in an airflow entering the air conditioner may be reduced, and may increase purity of air entering the air conditioner and may further increase purity of the air blown out of the air conditioner.

Specifically, as illustrated in FIG. 1 and FIG. 2, the filtration device 100 includes a frame 102 and a filtration structure 104. The frame 102 may be mounted at the housing 202 of the air conditioner to ensure mounting of the entire filtration device 100. The filtration structure 104 may be detachably connected to the frame 102 by the first buckle 106, and can provide an effect of filtering out impurities during operation of the air conditioner. In particular, the filtration structure 104 is connected to the frame 102 in a detachable manner. After the filtration device 100 has been used for a period of time, a user can disassemble the filtration structure 104 for cleaning, maintenance, or replacement. In addition, the filtration structure 104 is mounted by the first buckle 104, which makes it more convenient for the user to disassemble and assemble the filtration structure 104, and facilitates operations of the user. Further, the frame 102 itself may be mounted with a filtration member to realize multiple filtration.

Therefore, in the filtration device 100 according to the embodiment, the filtration structure 104 may be detachably connected to the frame 102 by the first buckle 106. After the filtration device 100 has been used for a period of time, the user can disassemble the filtration structure 104 for cleaning, maintenance, or replacement.

A second embodiment of the present disclosure provides a filtration device 100 on a basis of embodiment 1.

Figure 3:
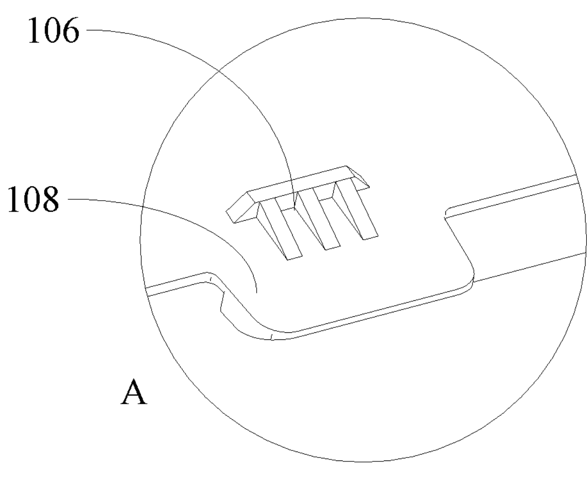
FIG. 3 is an enlarged partial view of part A of the frame illustrated in FIG. 2.

As illustrated in FIG. 2 and FIG. 3, the frame 102 is provided with the first buckle 106. The filtration structure 104 is snapped (e.g., snap-fit) at the first buckle 106. That is, the filtration device 100 provided in the embodiment is provided with the first buckle 106 at the frame 102. During mounting the filtration structure 104, the user may directly mount the filtration structure 104 to the frame 102, and realize a fixation by the first buckle 106 of the frame 102. On the one hand, stable mounting of the filtration structure 104 is ensured, and on the other hand, the convenience of disassembly and assembly by the user is ensured.

In a specific embodiment, a plurality of first buckles 106 may be provided. In addition, the plurality of first buckles 106 is ensured to be distributed on a circumferential side of the frame 102 to provide a plurality of buckle positions for the filtration structure 104, ensuring a buckle strength of the filtration structure 104.

In this embodiment, further, as illustrated in FIG. 2, the frame 102 is provided with a mounting protrusion 108 at a circumferential edge of the frame 102, and the first buckle 106 is disposed at the mounting protrusion 108. In addition, the mounting protrusion 108 extends towards a lateral side of the frame 102 and is formed as a mounting position 110. During mounting of the filtration structure 104, the filtration structure 104 may be directly mounted in the mounting position 110 and directly fixed with the first buckle 106.

Specifically, as illustrated in FIG. 3, the first buckle 106 is formed at the mounting protrusion 108 and is disposed on an inner side of the mounting position 110. In this way, the first buckle 106 may be directly snapped (e.g., snap-fit) at the filtration structure 104 when the filtration structure 104 is mounted at the mounting position 110, to ensure the mounting of the filtration structure 104. In addition, the first buckle 106 and the mounting protrusion 108 may be integrally formed to simplify both preparation of the first buckle 106 and an overall structure of the first buckle 106 and the mounting protrusion 108.

In addition, as illustrated in FIG. 2, the mounting protrusion 108 and the frame 102 are integrally formed. That is, during preparation of the frame 102, the frame 102 may be directly prepared by means of one-piece injection molding. In this way, with the one-piece design, on the one hand, a connection strength between the mounting protrusion 108 and the frame 102 can be ensured while avoiding use of additional connection members. On the other hand, preparation procedures of the frame 102 can be reduced, which facilitates an increase of a preparation efficiency of the frame 102.

Embodiment 3 of the present disclosure provides the filtration device 100 on the basis of embodiment 1.

As illustrated in FIG. 1 and FIG. 2, the frame 102 includes a first filtration screen. The filtration structure 104 includes a second filtration screen. In this way, during the use of the filtration device 100, filtering out impurities two times can be realized through cooperation between the first filtration screen and the second filtration screen, which greatly improves a filtration efficiency and filtration performance of the filtration device 100 on the impurities. In addition, the first filtration screen has a mesh number unequal to a mesh number of the second filtration screen, and thus filtration performance of the first filtration screen and filtration performance of the second filtration screen are different. In this way, primary filtration can be realized by one of the first filtration screen and the second filtration screen, and medium-efficiency filtration or high-efficiency filtration can be realized by the other one of the first filtration screen and the second filtration screen.

Specifically, as illustrated in FIG. 1 and FIG. 2, the mesh number of the second filtration screen is greater than the mesh number of the first filtration screen. Also, during the use of the filtration device 100, an airflow first passes through the first filtration screen. In this way, the primary filtration can be realized by the first filtration screen, and the medium-efficiency filtration or high-efficiency filtration can be realized by the second filtration screen.

In a specific embodiment, those skilled in the art can understand the concept of "mesh number". With an increase in the mesh number, a quantity of filtration holes per unit area becomes greater. That is, filtration performance improves as a density of the filtration holes increases.

Figure 4:
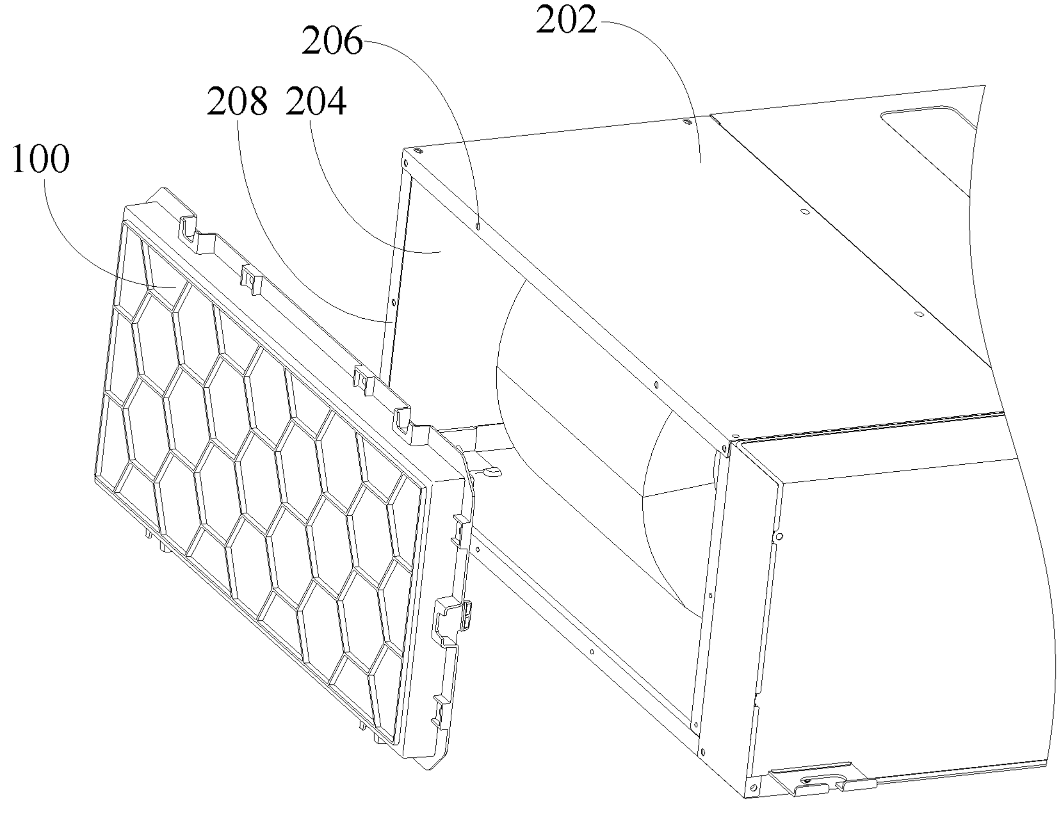
FIG. 4 is an assembled view of a filtration device in an air conditioner according to an embodiment of the present disclosure.
Figure 5:
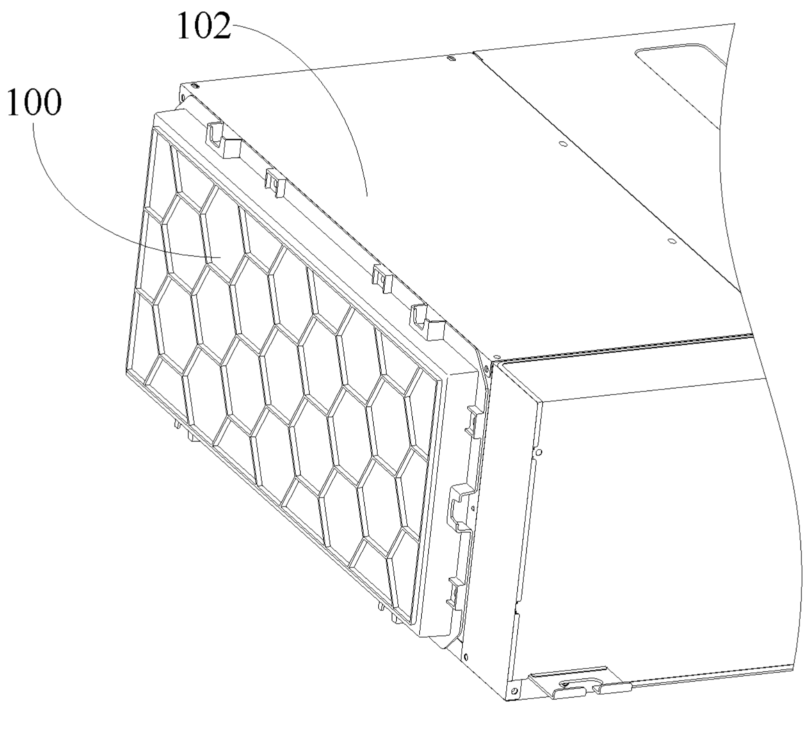
FIG. 5 is another assembled view of a filtration device in an air conditioner according to an embodiment of the present disclosure.

As illustrated in FIG. 4 and FIG. 5, embodiment 4 of the present disclosure provides an air conditioner. The air conditioner includes the housing 202 and the filtration device 100 according to any one of embodiment 1 to embodiment 3.

The air conditioner according to this embodiment includes the filtration device according to any one of embodiment 1 to embodiment 3. Therefore, the air conditioner can provide all the advantageous effects of the filtration device. Details thereof will be omitted here.

In addition, the housing 202 has an air inlet and a return air inlet 204 that are in communication with each other. An air duct is formed between the air inlet and the return air inlet 204. When the air conditioner is in operation, external air enters into the air duct from the return air inlet 204, and is blown out from the air outlet. The filtration device 100 is mounted at the return air inlet 204. The filtration device 100 provides filtration for the airflow passing through the return air inlet 204 to ensure that the impurities in the airflow entering the air duct are significantly reduced, which may increase purity of the air entering the air duct, may improve cleanness of an interior of the air conditioner, and may further increase purity of the air blown out from the air outlet.

In particular, as illustrated in FIG. 4 and FIG. 5, the filtration device 100 is directly connected to the housing 202 at the return air inlet 204 without adopting a flanging structure used in the related art. On the one hand, a quantity of components of the air conditioner can be lowered to reduce both a size and a weight of the air conditioner. On the other hand, assembly by a worker can be facilitated, which further improves an assembly efficiency of the filtration device 100, improving a manufacturing efficiency of the air conditioner.

Therefore, in the air conditioner according to the present disclosure, since the filtration device 100 is directly connected to the housing 202, the flanging structure in the related art is eliminated, which can reduce both the size and the weight of the air conditioner, and facilitate assembly and manufacturing by the worker.

Embodiment 5 of the present disclosure provides an air conditioner on the basis of embodiment 4.

Figure 6:
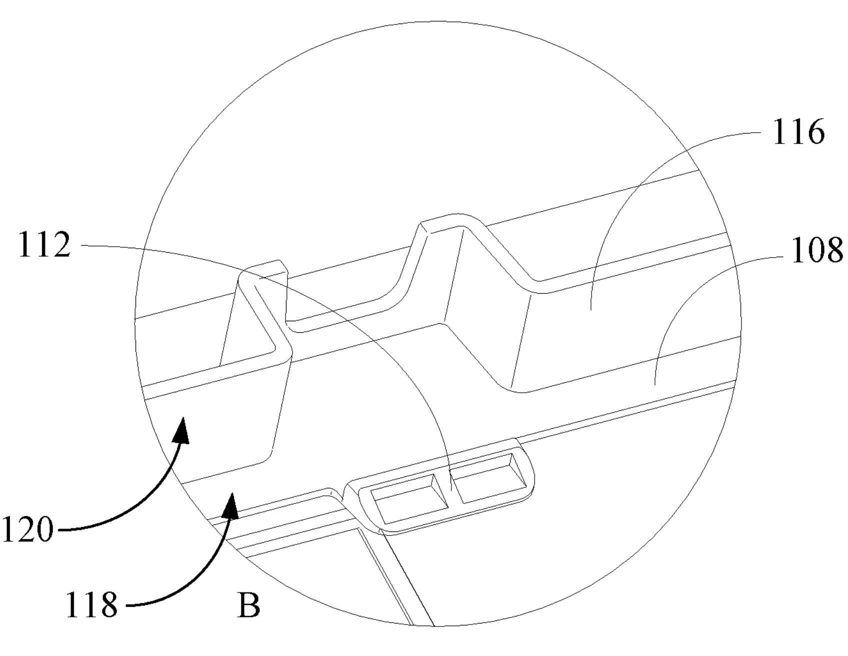
FIG. 6 is an enlarged partial view of part B of the frame illustrated in FIG. 2.

As illustrated in FIG. 2 and FIG. 6, the frame 102 includes a frame body 122 and a second buckle 112 disposed at the frame body 122. The frame 102 is snapped (e.g., snap-fit) at the return air inlet 204 by the second buckle 112. The frame 102 of the filtration device 100 is provided with the second buckle 112, in such a manner that the frame 102 is mounted at the return air inlet 204 in a buckle-fit manner. During assembly of the frame 102, the frame 102 may be directly mounted at a position of the return air inlet 204, and the second buckle 112 may be ensured to be snapped at the housing 202, to ensure that the frame 102 is stably mounted at the return air inlet 204, guaranteeing a stable connection between the filtration device 100 and the housing 202.

In particular, the second buckle 112 has a simple structure, and a buckle connection method is easy to operate. During mounting of the frame 102, the worker can directly buckle the frame 102 at the return air inlet 204 without additional tools, which is convenient for the worker to operate and is conducive to improving a mounting efficiency of the filtration device 100.

In a specific embodiment, a plurality of second buckles 112 may be provided. In addition, the plurality of second buckles 112 is ensured to be distributed on the circumferential side of the frame 102 to provide a plurality of buckle positions for the frame 102, ensuring a buckle strength of the frame 102.

Embodiment 6 of the present disclosure provides an air conditioner on the basis of embodiment 4.

Figure 7:
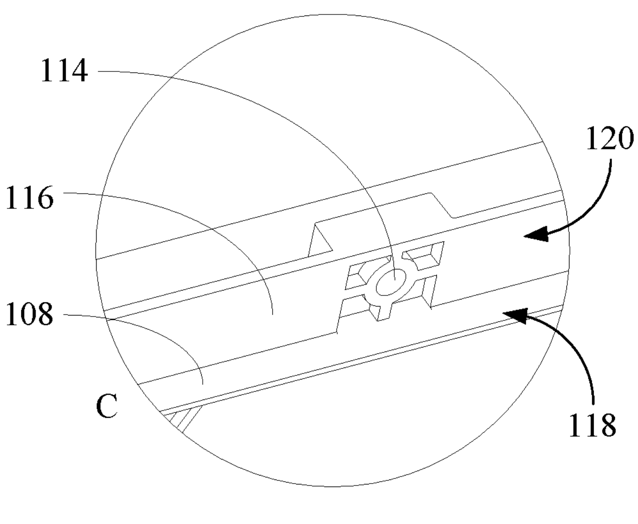
FIG. 7 is an enlarged partial view of part C of the frame illustrated in FIG. 2.

As illustrated in FIG. 2 and FIG. 7, the frame 102 includes the frame body 122 and a first mounting hole 114 formed at the frame body 122. The housing has a second mounting hole formed thereon. The second mounting hole 206 is formed at the return air inlet 204, which enables the frame 102 to be mounted at the return air inlet 204 by a fastener. Specifically, during the mounting of the frame 102, the frame 102 is placed at the position of the return air inlet 204, and a position of the first mounting hole 114 and a position of the second mounting hole 206 are ensured to be aligned with each other. Then, the fastener is made to pass through the first mounting hole 114 and is tightened into the second mounting hole 206 to ensure a stable connection between the frame 102 and the housing 202.

In particular, a connection method of the fastener can greatly improve a connection strength and connection stability of the frame 102 to prevent the filtration device 100 from falling off during the operation of the air conditioner.

In a specific embodiment, a plurality of fasteners may be provided. In addition, each of a quantity of the first mounting holes 114 and a quantity of the second mounting holes 206 matches a quantity of the fasteners, in such a manner that the frame 102 has a plurality of fastening positions, ensuring the connection strength of the frame 102.

Embodiment 7 of the present disclosure provides an air conditioner on the basis of embodiment 4.

As illustrated in FIG. 2, FIG. 6 and FIG. 7, the frame 102 includes the frame body 122, the first mounting hole formed at the frame body 122, and the second buckle 112 disposed at the frame body 122. The frame 102 of the filtration device 100 is provided with the second buckle 112, in such a manner that the frame 102 is mounted at the return air inlet 204 in the buckle-fit manner. In addition, the frame 102 has the first mounting hole 114 formed thereon and the second mounting hole 206 is formed at the return air inlet 204, in such a manner that the frame 102 is mounted at the return air inlet 204 by the fastener.

Specifically, during the mounting of the frame 102, the frame 102 is placed at the position of the return air inlet 204, and the position of the first mounting hole 114 and the position of the second mounting hole 206 are ensured to be aligned with each other. In this case, the second buckle 112 is snapped at the housing 202, which realizes preliminary mounting of the frame 102. Then, the fastener is made to pass through the first mounting hole 114 and is tightened into the second mounting hole 206 to ensure the stable connection between the frame 102 and the housing 202.

In particular, on the one hand, the second buckle 112 can provide preliminarily fixation for the frame 102. On the other hand, the second buckle 112 can provide positioning, which ensures that the frame 102 is positioned by the second buckle 112 during tightening of the fastener, ensuring that the position of the first mounting hole 114 and the position of the second mounting hole 206 are aligned with each other. Further, the worker is required to hold the frame 102. In addition, the fastener can provide secondary fixation, which greatly improves the connection strength and the connection stability of the frame 102.

Embodiment 8 of the present disclosure provides an air conditioner on the basis of embodiment 4.

As illustrated in FIG. 6 and FIG. 7, the mounting protrusion 108 of the frame 102 has a first sealing surface 118. After the mounting of the frame 102 is completed, the mounting protrusion 108 of the frame 102 extends into an inner wall of the housing 202, and the first sealing surface 118 is ensured to be attached to an inside of the housing, guaranteeing sealing between the frame 102 and the housing 202 at the return air inlet 204.

In this embodiment, further, as illustrated in FIG. 6 and FIG. 7, the frame 102 is provided with a limiting protrusion 116 at a circumferential edge of the frame 102. The limiting protrusion 116 extends towards a circumferential side of the frame 102 and is disposed at an outer circumference of the mounting protrusion 108. The limiting protrusion 116 has a second sealing surface 120 formed at a side of the limiting protrusion 116 facing towards the air inlet. After the mounting of the frame 102 is completed, the second sealing surface 120 is attached to the housing 202. On the one hand, a position limitation can be provided to ensure a size by which the mounting protrusion 108 extends into an inside of the return air inlet 204. On the other hand, the second sealing surface 120 of the frame 102 can be ensured to be directly and tightly attached to the housing 202, which ensures a sealing effect at the return air inlet 204.

Specifically, during the mounting of the frame 102, the mounting protrusion 108 is inserted into the inside of the return air inlet 204 to enable the mounting protrusion 108 to provide good guidance. Also, the first sealing surface 118 of the mounting protrusion 108 is attached to the inner wall of the housing 202 to ensure the sealing effect at the return air inlet 204 to a certain extent. After the mounting protrusion 108 is inserted into the inside of the return air inlet 204 for a distance, the second sealing surface 120 of the limiting protrusion 116 abuts against an end portion of the return air inlet 204 to limit an insertion depth of the mounting protrusion 108. In this case, the second sealing surface 120 is attached to the end portion of the return air inlet 204. Thus, through the cooperation between the first sealing surface 118 of the mounting protrusion 108 and the second sealing surface 120 of the limiting protrusion 116, sealing performance at the return air inlet 204 is ensured.

In this embodiment, further, as illustrated in FIG. 6 and FIG. 7, the housing 202 is provided with a flanging 208 at the return air inlet 204. The flanging 208 bends towards an inner side of the return air inlet 204. After the mounting of the frame 102 is completed, the second sealing surface 120 of the frame 102 is directly attached to the flanging 208, which ensures an attachment area between the second sealing surface 120 and the flanging 208, ensuring the sealing performance at the return air inlet 204.

In a specific embodiment, the housing 202 directly bends at the return air inlet 204 to form the flanging 208, and a bending direction of the flanging 208 faces towards an inner side of the housing 202.

In addition, a sealing member (not illustrated in the figure) may further be disposed between the second sealing surface 120 and the flanging 208 to further improve the sealing effect between the second sealing surface 120 and the flanging 208 by the sealing member. It is conceivable for those skilled in the art that whether to add the sealing member can be determined as desired.

In addition, the air conditioner further includes a fan (not illustrated in the figure). The fan is disposed in the housing 202, is located between the air inlet and the return air inlet 204, and can be configured to drive external air to enter into the interior of the air duct from the return air inlet 204 and be discharged from the air outlet.

In addition, the air conditioner further includes a heat exchanger (not illustrated in the figure). The heat exchanger is disposed in the housing 202, is located between the air inlet and the return air inlet 204, and can be configured to exchange heat with the air in the air duct to realize a cooling and heating capacity of the air conditioner.

As is illustrated in FIG. 1 and FIG. 2, embodiment 1 of the present disclosure provides the filtration device 100. The filtration device 100 includes the frame 102 and the filtration structure 104. The frame 102 may be mounted at the housing 202 of the air conditioner to ensure the mounting of the entire filtration device 100. The filtration structure 104 may be detachably connected to the frame 102 by the first buckle 106, and can provide the effect of filtering out the impurities during the operation of the air conditioner. After the filtration device 100 is used for a period of time, the user can disassemble the filtration structure 104 for cleaning, maintenance, or replacement.

In this embodiment, further, as illustrated in FIG. 2 and FIG. 3, the first buckle 106 is disposed at the frame 102. The filtration structure 104 is snapped at the first buckle 106. In addition, the mounting protrusion 108 is disposed at the circumferential edge of the frame 102. The first buckle 106 is disposed at the mounting protrusion 108. In addition, the mounting protrusion 108 extends towards the lateral side of the frame 102 and is formed as the mounting position 110. During the mounting of the filtration structure 104, the filtration structure 104 may be directly mounted at the mounting position 110 and directly fixed by the first buckle 106.

In this embodiment, further, as illustrated in FIG. 1 and FIG. 2, the frame 102 includes the first filtration screen, and the filtration structure 104 includes the second filtration screen. The second filtration screen has the mesh number greater than the mesh number of the first filtration screen. In this way, the primary filtration can be realized by the first filtration screen, and the medium-efficiency filtration or the high-efficiency filtration can be realized by the second filtration screen.

Embodiment 2 of the present disclosure provides the air conditioner. The air conditioner includes the filtration device 100 according to embodiment 1 of the present disclosure.

In addition, as illustrated in FIG. 4 and FIG. 5, the housing 202 has the air inlet and the return air inlet 204 that are in communication with each other. The filtration device 100 is directly connected to the housing 202 at the return air inlet 204 without adopting the flanging structure used in the related art. On the one hand, the quantity of components of the air conditioner can be lowered to reduce both the size and the weight of the air conditioner. On the other hand, assembly by the worker can be facilitated, which further improves the assembly efficiency of the filtration device 100, improving the manufacturing efficiency of the air conditioner.

In this embodiment, further, as illustrated in FIG. 2, FIG. 6, and FIG. 7, the second buckle 112 may be disposed at the frame 102 of the filtration device 100, in such a manner that the frame 102 is mounted at the return air inlet 204 in the buckle-fit manner. The first mounting hole 114 may be formed at the frame 102 of the filtration device 100 and the second mounting hole 206 may be formed at the return air inlet 204, in such a manner that the frame 102 is mounted at the return air inlet 204 by the fastener.

In this embodiment, further, as illustrated in FIG. 6 and FIG. 7, the mounting protrusion 108 of the frame 102 has the first sealing surface 118. After the mounting of the frame 102 is completed, the mounting protrusion 108 of the frame 102 extends to the inner wall of the housing 202, and the first sealing surface 118 is ensured to be attached to the inside of the housing 202, guaranteeing the sealing between the frame 102 and the housing 202 at the return air inlet 204. In addition, as illustrated in FIG. 6 and FIG. 7, the limiting protrusion 116 is disposed at the circumferential edge of the frame 102. The limiting protrusion 116 extends towards the circumferential side of the frame 102 and is disposed at the outer circumference of the mounting protrusion 108. The limiting protrusion 116 has the second sealing surface 120 formed at the side of the limiting protrusion 116 facing towards the air inlet. After the mounting of the frame 102 is completed, the second sealing surface 120 is attached to the housing 202. On the one hand, the position limitation can be provided to ensure the size by which the mounting protrusion 108 extends into the inside of the return air inlet 204. On the other hand, the second sealing surface 120 of the frame 102 can be ensured to be directly and tightly attached to the housing 202, which ensures the sealing effect at the return air inlet 204. In addition, as illustrated in FIG. 6 and FIG. 7, the flanging 208 is disposed at the return air inlet 204 of the housing 202. The flanging 208 bends towards the inner side of the return air inlet 204. After the mounting of the frame 102 is completed, the second sealing surface 120 of the frame 102 is directly attached to the flanging 208, which ensures the attachment area between the second sealing surface 120 and the flanging 208, ensuring the sealing performance at the return air inlet 204

In this embodiment, further, the air conditioner further includes the fan. The fan is disposed in the housing 202, is located between the air inlet and the return air inlet 204, and can be configured to drive the external air to enter into the interior of the air duct from the return air inlet 204 and be discharged from the air outlet. The air conditioner further includes the heat exchanger. The heat exchanger is disposed in the housing 202, is located between the air inlet and the return air inlet 204, and can be configured to exchange heat with the air in the air duct to realize the cooling and heating capacity of the air conditioner.

In the related art, the filtration device of the air conditioner is mounted at the return air inlet of the housing through the flanging structure. Specifically, during mounting of the filtration device, the flanging structure is fixed at the return air inlet of the housing, and then the filtration device is fixed to the flanging structure. The flanging structure is a sheet metal structure, which increases an overall size and an overall weight of the air conditioner. Also, it is difficult to ensure sealing performance of a connection position between the filtration device and the flanging structure, which makes it difficult to ensure the sealing performance at the return air inlet. Moreover, it is inconvenient to disassemble the filtration device.

Therefore, as illustrated in FIG. 4 and FIG. 5, the air conditioner according to the present disclosure eliminates the flanging structure in the related art. The frame 102 of the filtration device 100 is directly mounted at the return air inlet 204 of the housing 202. The filtration device 100 is made to be directly connected to the housing 202. In addition, a type of the filtration device 100 may be selected as desired among a type of a low-efficiency filtration device, a type of a medium-efficiency filtration device, and a type of a high-efficiency filtration device. Further, the filtration structure 104 may be mounted at the frame 102 of the filtration device 100 to allow the filtration device 100 to be used in conjunction with the filtration structure 104, providing the users with more choices.

In a specific embodiment, as illustrated in FIG. 2, FIG. 6, and FIG. 7, the frame 102 of the filtration device 100 is provided with the second buckle 112, the mounting protrusion 108, the limiting protrusion 116, and the first mounting hole 114. The second mounting hole 206 and the flanging 208 are formed at the return air inlet 204. As illustrated in FIG. 4 and FIG. 5, during the mounting of the filtration device 100, the frame 102 is fixed at the return air inlet 204 of the housing 202 by the second buckle 112. In this case, the mounting protrusion 108 extends into the inside of the return air inlet 204. The first sealing surface 118 of the mounting protrusion 108 is attached to the inner wall of the housing 202, and the second sealing surface 120 of the limiting protrusion 116 is tightly attached to the flanging 208 at the return air inlet 204, realizing sealing between the frame 102 and the housing 202 at the return air inlet 204. In addition, the fastener may be made to pass through and be tightened into the first mounting hole 114 to fix the frame 102 at the return air inlet 204 of the housing 202. Specifically, the fastener may be a screw, and each of the first mounting hole 114 and the second mounting hole 206 may be a screw hole.

In a specific embodiment, as illustrated in FIG. 1 and FIG. 2, the frame 102 includes the first filtration screen, and the filtration structure 104 includes the second filtration screen. In this way, during the use of the filtration device 100, filtering out impurities two times can be realized through the cooperation between the first filtration screen and the second filtration screen. Specifically, the filtration structure 104 is fixed to the filtration structure 104 by the first buckle 106. The first filtration screen may be a coarse filtration screen, while the second filtration screen may be a medium-efficiency filtration screen or a high-efficiency filtration screen.

Therefore, in the air conditioner according to the present disclosure, the filtration device 100 is directly connected to the housing 202, and the flanging structure in the related art is eliminated. During the mounting of the filtration device 100, the worker can directly buckle the filtration device 100 at the return air inlet 204 without using additional tools, which is convenient for the worker to operate and is conducive to improving the mounting efficiency of the filtration device 100. Also, the size of the air conditioner can be greatly reduced. The weight of the air conditioner can be lightened. Assembly and manufacturing by the worker can be facilitated.

Moreover, on a basis of eliminating the flanging structure, the present disclosure can ensure that after the mounting of the filtration device 100 is completed, the first sealing surface 118 of the mounting protrusion 108 is attached to the inner wall of the housing 202, and the second sealing surface 120 of the limiting protrusion 116 is tightly attached to the flanging 208 at the return air inlet 204, which realizes sealing at the return air inlet 204, effectively solving a problem in the related art of a poor sealing effect at the return air inlet.

In the present disclosure, the term "plurality" means two or more, unless otherwise specified defined. Terms such as "install", "connect", "connect to", and "fix" should be understood in a broad sense. For example, it may be a fixed connection or a detachable connection or connection as one piece; or a direct connection or indirect connection through an intermediate. For those skilled in the art, the specific meaning of the above-mentioned terms in the present disclosure can be understood according to specific circumstances.

In the description of the present disclosure, description of terms such as "an embodiment", "some embodiments", and "a specific embodiment" means that specific features, structures, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials, or characteristics may be combined in any one or more embodiments or examples in a suitable manner.

While preferred embodiments of the present disclosure have been described above, the present disclosure is not limited to these embodiments. For those skilled in the art, various changes and variations can be made to the present disclosure. Any modification, equivalent substitution, improvement, etc., made within the spirit and principles of the present disclosure shall fall within the scope of the present disclosure.

What is claimed is:

1. A filtration device for an air conditioner, the filtration device comprising:
- a frame configured to be mounted to a housing of the air conditioner; and
- a filtration structure detachably connected to the frame by a first buckle, wherein:
- the frame is provided with a mounting protrusion at a circumferential edge of the frame, the mounting protrusion extending towards a lateral side of the frame and being formed as a mounting position;
- the first buckle is disposed at the mounting protrusion, and the filtration structure is detachably mounted at the mounting position;
- the frame comprises a first filtration screen, and the filtration structure comprises a second filtration screen; and
- a mesh number of the first filtration screen is different from a mesh number of the second filtration screen.

2. The filtration device according to claim 1, wherein the frame is provided with the first buckle, the filtration structure being snapped at the first buckle.

3. An air conditioner, comprising:
- a housing having a return air inlet and an air outlet that are in communication with each other; and
- a filtration device comprising:
  - a frame configured to be mounted to the housing of the air conditioner; and
  - a filtration structure detachably connected to the frame by a first buckle, wherein the frame of the filtration device is mounted at the return air inlet and is detachably connected to the housing, the frame comprises a first filtration screen, and the filtration structure comprises a second filtration screen; and
- a mesh number of the first filtration screen is different from a mesh number of the second filtration screen, wherein the mesh number of the second filtration screen is greater than the mesh number of the first filtration screen.

4. The air conditioner according to claim 3, wherein the frame comprises a frame body and a second buckle disposed at the frame body, and is snapped at the return air inlet by the second buckle.

5. The air conditioner according to claim 3, wherein:
- the frame comprises a frame body and a first mounting hole formed at the frame body, and the housing has a second mounting hole formed thereon; and
- the air conditioner further comprises a fastener passing through the first mounting hole and mounted in the second mounting hole.

6. The air conditioner according to claim 3, wherein a mounting protrusion of the frame has a first sealing surface and extends into the housing, the first sealing surface being attached to an inner wall of the housing.

7. The air conditioner according to claim 3, wherein:
- the frame is provided with a limiting protrusion at a circumferential edge of the frame; and
- the limiting protrusion extends towards a circumferential side of the frame and has a second sealing surface facing towards a side of the return air inlet, the second sealing surface being attached to the housing.

8. The air conditioner according to claim 7, wherein the housing is provided with a flanging at the return air inlet, the second sealing surface being attached to the flanging.

9. The air conditioner according to claim 3 wherein the frame is provided with the first buckle, the filtration structure being snapped at the first buckle.

10. The air conditioner according to claim 3, wherein:
- the frame is provided with a mounting protrusion at a circumferential edge of the frame, the mounting protrusion extending towards a lateral side of the frame and being formed as a mounting position; and
- the first buckle is disposed at the mounting protrusion, and the filtration structure is detachably mounted at the mounting position.

* * * * *